United States Patent Office 3,256,931
Patented June 21, 1966

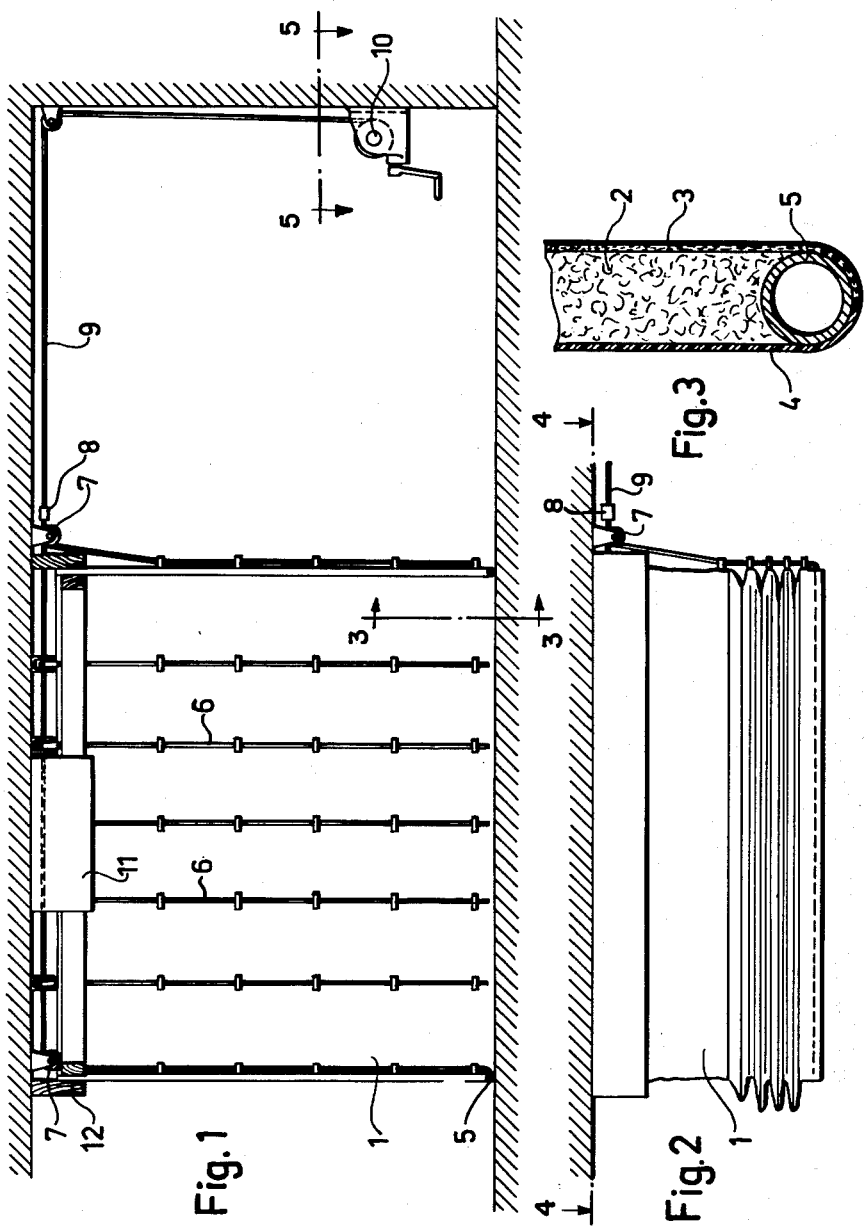

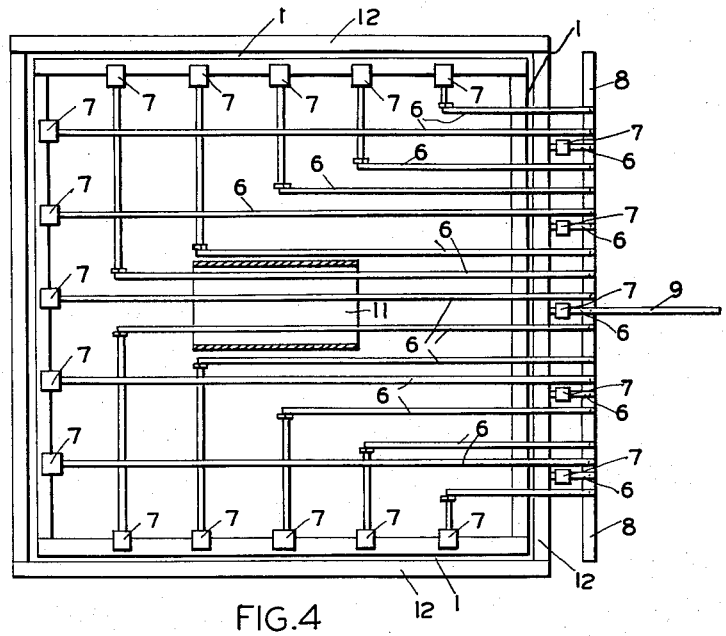
FIG.4
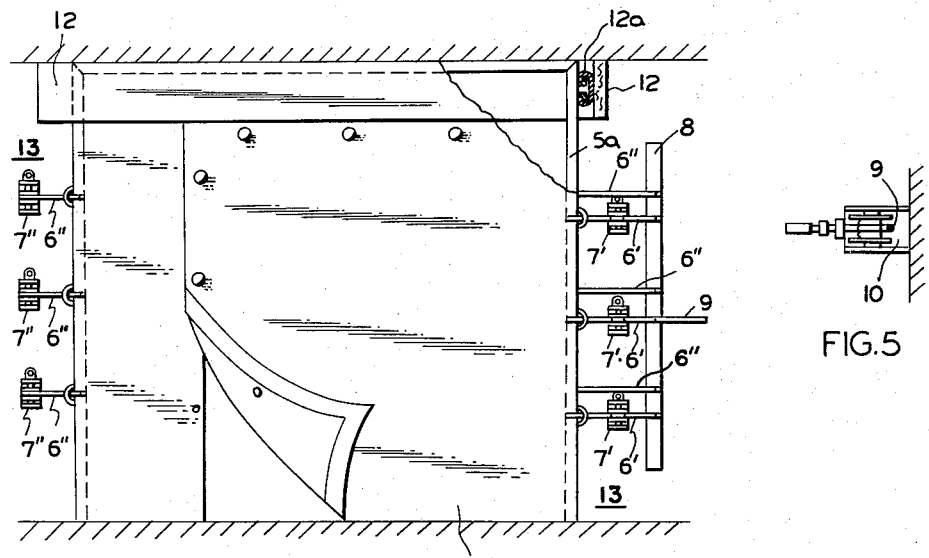
FIG.6
FIG.5

3,256,931
COLD STORAGE ROOM
Carl Oskar Alfred Öijerholm, deceased, late of Stockholm, Sweden, by Carl Anders Grufman, administrator, Stockholm, Sweden, assignor to A.-B. Banan-Kompaniet, Stockholm, Sweden, a limited company of Sweden
Filed Nov. 15, 1962, Ser. No. 238,334
15 Claims. (Cl. 165—46)

The present invention relates to cold storage rooms and has for its main object to provide such a room which has a large capacity in the sense that, in principle, the entire volume confined by its walls will constitute useful storage space.

Another object of the invention is to provide a cold storage room having walls of such a design as to make it possible to convey goods into and out from the room in very short time.

A further object of the invention is to provide a cold storage room the interior of which can be made accessible for introduction or removal of the goods from any side of the room or from all sides thereof simultaneously.

The advantages above enumerated, according to the principal features of the invention, have been attained thereby, that at least its vertical confining walls, in a manner known per se, consist of flexible heat-insulating materials, are provided with means adapted by flexing or folding the walls to cause rapid opening of the latter, whereby direct communication is established between the spaces at both sides of the same over the major portion of the surface area of each openable wall.

One embodiment of the invention will be described hereinafter by way of example, reference being had to the accompanying diagrammatic drawing, in which:

FIG. 1 shows a vertical section through an arrangement embodying the invention;

FIG. 2 is a part-elevational view of the arrangement in FIG. 1, and with the cold-room walls in a raised position;

FIG. 3, on an enlarged scale, shows a vertical section through the bottom portion of the cold-room wall;

FIG. 4 is a plan view of the arrangement of FIGURE 2;

FIG. 5 is a plan view, partially in section, of the winch mechanism of FIGURE 1; and FIG. 6 is a front elevational view, partially in section, of a horizontally folding cold-room.

The cold-room, in the present instance, is disposed within a larger locality, such as a storage house, the floor and ceiling of which are indicated in FIG. 1. The horizontal section of the cold storage room may have any convenient configuration, although a rectangular or circular contour is generally preferable. Numeral 1 designates the wall of the room consisting of a heat insulating layer 2 interposed between an internal cover 3 and an external cover 4. The covers 3 and 4 are joined at the bottom edge, by sewing or other means, where they embrace a frame 5 consisting preferably of metal tubing. Secured to the latter, by self-tapping screws or rivets passing through the cover and into the frame, are the lower ends of a plurality of pull ropes 6 equally spaced along the entire length of that portion of the wall of the room that is adapted to be raised and lowered. As already indicated, it is according to the invention preferable to have the wall arranged in this manner all around the periphery of the room. The pull ropes 6 pass over idle pulleys 7 to a rod 8 to which their opposite ends are secured. From the rod a cable 9 extends to a suitable operating mechanism 10, being in the simplest case a hand winch. However, where larger cold storage rooms are concerned, the operating mechanism may be power driven in which case primarily an electric motor comes into question and the arrangement, in a manner known per se, is equipped with limit switches and the like adapted to turn off the operating current as the wall has reached either of its two extreme end positions. By 11, finally, has been designated a refrigerating unit of any suitable design, and by 12 a powerful frame disposed immediately underneath the ceiling of the locality and adapted to carry the wall structure 1, and suitably also the pulleys 7 as well as the unit 11.

As shown in FIG. 2, according to which the wall is near its top end position, the wall is folded when being lifted. FIG. 3 illustrates in detail the construction of the wall in accordance with the preferred embodiment described hereinbefore. The heat-insulating layer 2 preferably consists of a cellular plastic material, although any suitable other heat-insulating material may be used. The cover 3 may consist, for instance, of canvas or any other similar material. It has dual purposes, viz. firstly to form a confinement for the insulation 2 to retain the latter in place, and secondly, to form a mechanical protection for said insulation. Cover 4 also has dual purposes, one being again, of course, to retain the heat-insulating layer 2 in place. In addition, this cover is to act as a diffusion barrier layer and, therefore, should consist of some diffusion-impermeable material, such as plastic sheeting.

FIGURE 4 illustrates in detail the rope operating mechanism which is adapted to raise the cold-room walls to the position shown in FIGURE 2 when line 9 is pulled. It is to be noted that except for the fact that the ropes 6 pass through eyelets on the interior of the left, front and rear walls, all of the ropes 6 pass over appropriate pulleys 7 and thence to the bar 8. Of course, the ropes on those walls perpendicular to bar 8 pass through appropriate eyelets or eyebolts mounted in the ceiling, or otherwise, to make a 90° angle before passing to bar 8. FIGURE 5 shows a top view of the winch 10 utilized to pull line 9.

From the above description when read in conjunction with the accompanying drawing, it will be seen that a cold storage room constructed in accordance with the invention exhibits essential advantages as compared to prior conventional cold storage rooms, the latter, as is well known, having rigid walls which cannot be opened entirely.

Generally, the most important advantage is that, owing to the possibility of withdrawing all the walls of the room, the goods being stored within the space enclosed thereby will be made accessible from all sides. This involves not only that their displacement into and out from the cold storage room can be carried out in a substantially shorter time than before, constituting already in itself a very important advantage, particularly where fruit and other delicate goods are concerned which are subjected to the risk of being qualitatively impaired by the temperature increase inevitably occurring in conjunction with an opening of the room, but also because of the fact that this makes it possible to utilize the entire floor area of the cold storage room.

Another very essential advantage resides in that the structure concerned can readily be moved from one place to another. In certain cases it may be suitable to construct the entire cold storage room including the refrigerating unit and the operating mechanism for the wall structures as a bodily movable unit. In those cases such movement can be carried out, for instance, by making the frame 12 carry, in addition to the walls of the cold room, also the operating elements 7, 8, 9, 10 for the latter as well as the refrigerating unit 11, and to be bodily displaceable, for instance along tracks secured to the ceiling of the surrounding locality.

The construction of the walls also makes it possible to mount the cold storage room, for example, at a loading bridge, quay or the like or generally, at any place where loading or unloading is to take place. It may be mentioned by way of example that in the food-products trade there is frequently a requirement that the food products can be stored at low temperature for a relatively short period of time, for instance overnight, and then distributed early next morning. However, especially when the food products consist of fruits, it is highly desirable to be able to minimize the number of handlings and redispositions of the goods. A cold storage room constructed in accordance with this invention makes it possible, for example, to let a truck or freight wagon, carrying goods of the kind just specified on its load-carrying platform, to be driven into a storage house or any other storage space and be stopped in a position in which the platform is situated below the mounting frame of the walls of the cold storage room, these walls being, of course, pulled into their raised position during the corresponding movements of the vehicle. When the vehicle has attained the proper position, the walls are lowered around the food products carried on the load platform so that the latter will be enclosed in a cold room the floor of which is constituted, completely or in part, by the load platform. In this manner the goods may be stored overnight at low temperature without any need of having them unloaded and then re-loaded the load-carrying vehicle being, in addition, prepared in the morning for immediate further transportation of the goods.

The embodiment of the invention above described and illustrated in the drawing is intended merely to exemplify the inventive concept and may be highly modified within the scope of the appended claims. Thus, for instance, it is by no means necessary to use a wall structure which can be raised and lowered, but the same may instead be movable sideways in the manner of a curtain. FIGURE 6 is a front view of an embodiment adapted to be movable sidewise. It is to be noted that with minor variations the horizontally-movable version of FIGURE 6 is substantially the same as the embodiment of FIGURES 1 and 2 turned sidewise. One of the minor variations includes the provision of an inverted U-shaped frame 5a mounted across the top of the front and down the front corners of the cold-room. This frame is adapted to slide horizontally in a track-type slide mechanism 12a mounted along the right and left sides of the interior of frame 12. The cold-room body is adapted to fold accordion-style against back wall 13 of the main building structure. The folding mechanism is substantially the same as that of FIGURES 1 and 2 except that it is mounted on back wall 13. Pulleys 7' and 7" are attached to back wall 13 as shown. Ropes 6" pass through eyelets on the left side of the cold-room, then over pulleys 7", along the back wall 13, behind the cold room and thence to bar 8. Ropes 6' pass through eyelets on the right side of the cold room, under pulleys 7' and thence to bar 8. A winch such as that of FIGURE 5 pulls rope 9. Obviously, some type of opening must be provided in the front of a horizontally-movable version. Such an opening can simply be a vertical slit, provided with appropriate snap fasteners, a zipper or the like, adapted to provide a triangular-shaped opening flap or a vertical and a horizontal slit to provide a rectangular-shaped opening flap, as shown in FIGURE 6. Practical experiments carried out, however, have shown that, as a rule, the vertical movement is preferable, because this enables the openable wall to extend continuously all around the room. Further, it is self-evident that the heat-insulating property of the wall structure could also be utilized under conditions where the temperature in the space inside the wall is to be higher instead of lower than the ambient temperature. Finally, it should be added that, as indicated hereinbefore, a cold storage room constructed according to the invention can, as a rule, be defined at its top and bottom by the ceiling and floor, respectively, of the surrounding space. Especially where the cold storage room is to be readily movable as a unit it may, however, be convenient to equip the same with a roof of its own consisting of a highly heat-insulating material. It should also be added that it is per se of no importance whether the higher temperature is within or outside the chamber. In other words, the invention may be applied to heat storage rooms also, it being understood that in such a case covers 3 and 4 must be interchanged.

It is claimed:
1. A storage room for use in conjunction with a larger storage area having a floor and a ceiling of greater areal extent than the horizontal cross-sectional area of said storage room, comprising:
   (a) a pliable wall structure suspended from said ceiling and extending to said floor whereby said ceiling and said floor also form the ceiling and floor of said storage room;
   (b) said wall structure forming a continuous exterior wall of said storage room;
   (c) said wall structure comprising a thick layer of cellular plastic insulating material, a thinner canvas covering on its interior side and a thinner impervious plastic covering on its exterior side;
   (d) said canvas covering and said plastic covering being joined at their lowermost ends;
   (e) said wall structure being foldable to a restricted vertical dimension adjacent said ceiling;
   (f) a tubular metal peripheral frame member disposed within the pocket formed about the bottom periphery of said wall structure where said canvas covering and said plastic covering are joined;
   (g) a plurality of flexible ropes attached to said frame member about the periphery of said wall structure and passing over an equal number of pulleys attached to said ceiling;
   (h) an elongated rod attached to the upper, free ends of all of said ropes adjacent said ceiling;
   (i) a flexible cable means attached to said rod and passing over an additional pulley;
   (j) a hand-operable winch attached to the free end of said flexible cable;
   (k) said winch, in cooperation with said cable, said pulleys, and said ropes, being adapted to fold said wall structure against said ceiling and expose an unencumbered area for ingress to and egress from the area normally encompassed by said wall structure; and
   (l) a refrigerating unit attached to said ceiling and adapted to supply cold air to the interior of said storage room.

2. A storage unit for use in conjunction with a larger storage area having a floor and a ceiling of greater areal extent than the horizontal, cross-sectional area of said storage unit, comprising:
   (a) a pliable wall structure suspended from said ceiling and extending to said floor to encompass a storage area of limited extent on said floor;
   (b) said wall structure including a thermal insulating material adapted to maintain a substantial differential temperature between the space exteriorly of said wall structure and the space encompassed by said wall structure;
   (c) said wall structure forming a continuous exterior wall of said storage unit;
   (d) said wall structure being foldable to a restricted vertical dimension adjacent its upper end; and
   (e) means for folding said wall structure to a restricted vertical dimension adjacent its upper end to expose an unencumbered area for ingress to and egress from the area normally encompassed by said wall structure.

3. A storage unit for use in conjunction with a larger storage area having a floor and a ceiling of greater areal extent than the horizontal, cross-sectional area of said storage unit, comprising:
- (a) a pliable wall structure suspended from said ceiling and extending to said floor to encompass a storage area of limited extent on said floor;
- (b) said wall structure including a thermal insulating material adapted to maintain a substantial differential temperature between the space exteriorly of said wall structure and the space encompassed by said wall structure;
- (c) said wall structure being foldable to expose an unencumbered passageway along said floor for ingress to and egress from the area normally encompassed by said wall structure; and
- (d) means for folding said wall structure which is foldable.

4. A storage unit in accordance with claim 3 wherein the wall structure folds laterally to a restricted horizontal dimension.

5. A storage unit in accordance with claim 3 wherein the wall structure folds upwardly to a restricted vertical dimension.

6. A storage unit in accordance with claim 3 wherein the means for folding the wall structure includes a plurality of flexible ropes tied to the lower edge of the wall structure.

7. A storage unit in accordance with claim 3 wherein the means for folding the wall structure includes a rigid frame member along the bottom of said wall structure and a plurality of ropes tied to said frame.

8. A storage unit in accordance with claim 3 wherein the wall structure includes a relatively thick layer of insulating material and an inner and an outer sheet of cloth-like material as a retaining and protecting cover for said insulating material.

9. A storage unit in accordance with claim 8 wherein the insulating material is a cellular plastic material.

10. A storage unit in accordance with claim 8 wherein the inner cover is made of canvas.

11. A storage unit in accordance with claim 8 wherein the exterior cover is an impervious plastic sheeting.

12. A storage unit in accordance with claim 3 wherein the storage unit is suspended from a track system and is movable horizontally along said tracks.

13. A storage unit in accordance with claim 3 which additionally includes a refrigerating unit adapted to supply cold air to the interior space of said storage unit.

14. A storage unit in accordance with claim 3 wherein the means for folding the wall structure is a hand-operated winch.

15. A storage unit in accordance with claim 3 wherein the means for folding the wall structure is electrically operated.

References Cited by the Examiner

UNITED STATES PATENTS

| | | |
|---|---|---|
| 1,072,340 | 9/1913 | Liljegran. |
| 2,255,837 | 9/1941 | Volk _____ 135—5 |
| 2,353,909 | 7/1944 | Lager _____ 6—239 X |
| 2,556,418 | 6/1951 | Del Mar _____ 62—440 X |

FOREIGN PATENTS

| | | |
|---|---|---|
| 638,183 | 5/1950 | Great Britain. |
| 835,409 | 5/1960 | Great Britain. |

ROBERT A. O'LEARY, *Primary Examiner.*

CHARLES SUKALO, *Examiner.*

A. W. DAVIS, *Assistant Examiner.*